United States Patent
Yu et al.

(10) Patent No.: US 7,899,017 B2
(45) Date of Patent: Mar. 1, 2011

(54) SWITCHING BETWEEN TWO COMMUNICATION MODES IN A WLAN

(75) Inventors: Xiu Lan Yu, Beijing (CN); Ying Chen, Beijing (CN); Li Hua Tang, Beijing (CN); Shi Xia Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 663 days.

(21) Appl. No.: 11/377,484

(22) Filed: Mar. 16, 2006

(65) Prior Publication Data

US 2006/0215576 A1 Sep. 28, 2006

(30) Foreign Application Priority Data

Jan. 5, 2005 (CN) ............ 2005 1 0004027

(51) Int. Cl.
*H04W 4/00* (2009.01)
(52) U.S. Cl. ............ 370/338; 455/426.2; 455/436; 455/437; 455/438; 455/439; 455/440; 455/441; 455/442; 455/443; 455/444; 455/445; 455/550.1
(58) Field of Classification Search ............ 370/338; 455/426.2, 445, 550.1
See application file for complete search history.

(56) References Cited

U.S. PATENT DOCUMENTS

| | | | |
|---|---|---|---|
| 6,961,762 B1 * | 11/2005 | Yeap et al. ............ 709/221 |
| 7,400,621 B2 * | 7/2008 | Godfrey et al. ............ 370/389 |
| 2001/0024443 A1 | 9/2001 | Alriksson et al. |
| 2003/0054818 A1 | 3/2003 | Bahl et al. |
| 2003/0142652 A1 | 7/2003 | Ting et al. |
| 2003/0210700 A1 | 11/2003 | Chen |
| 2003/0235174 A1 | 12/2003 | Pichna et al. |
| 2003/0236064 A1 | 12/2003 | Shiohara et al. |
| 2004/0004951 A1 | 1/2004 | Zuniga et al. |
| 2004/0063458 A1 * | 4/2004 | Hori et al. ............ 455/554.2 |
| 2004/0077336 A1 | 4/2004 | Lauriol |
| 2004/0090924 A1 | 5/2004 | Giaimo et al. |
| 2004/0125778 A1 | 7/2004 | Lin et al. |
| 2004/0127214 A1 | 7/2004 | Reddy et al. |
| 2004/0179503 A1 * | 9/2004 | Godfrey et al. ............ 370/338 |
| 2004/0230370 A1 * | 11/2004 | Tzamaloukas ............ 701/200 |
| 2005/0282494 A1 * | 12/2005 | Kossi et al. ............ 455/41.2 |
| 2006/0040705 A1 * | 2/2006 | Kawakami et al. ............ 455/561 |
| 2006/0111045 A1 * | 5/2006 | Orlassino et al. ............ 455/41.2 |
| 2007/0045424 A1 * | 3/2007 | Wang ............ 235/462.46 |

* cited by examiner

*Primary Examiner* — Rafael Pérez-Gutiérrez
*Assistant Examiner* — Liton Miah
(74) *Attorney, Agent, or Firm* — Michael J. Buchenhorner; Vazken Alexanian

(57) ABSTRACT

Method and system for switching a network application operating in a first communication mode to a second mode within a wireless local area network, comprising: judging whether mobile nodes are neighboring according to location information; when nodes are neighboring inquiring whether mobile nodes want to switch to second mode to run network applications; when all mobile nodes agree to switch to second mode, downloading and installing network application provided by the application server to one of the mobile nodes; configuring each of the mobile nodes with the communication parameters under the second mode; and switching all mobile nodes to the second communication mode to continue the previous network application. The invention dynamically switches between Infrastructure mode and Ad-hoc mode to balance system resources, improve QoS, reduce the communication traffic, waiting time and the cost of the users, and increase the income of the provider of the network service.

20 Claims, 6 Drawing Sheets

SWITCHING BETWEEN TWO COMMUNICATION MODES IN A WLAN

FIELD OF THE INVENTION

The present invention is generally related to wireless network communication technology. More particularly, the present invention is related to the method and system of on-demand switching between two different types of communication mode in the wireless local network, i.e. Infrastructure Mode and Ad-hoc Mode.

BACKGROUND OF THE INVENTION

In network application, when the transport media is changed from wire to radio waves, the communication protocol 802.11 (i.e. Wireless Local Network WLAN) is used, which was defined by IEEE. Protocol 802.11 technologies provide high speed wireless connection to the network. The 802.11 standard defines two network modes: infrastructure mode and Ad-hoc mode. In infrastructure mode, a mobile user accesses network and communicates with other mobile users through access point (AP); while in Ad-hoc mode, the mobile users communicate with each other in a peer to peer mode. To be more specific, the computer users normally using WLAN can work in two modes: infrastructure mode and Ad-hoc mode. Infrastructure mode is used for mobile nodes i.e. the wireless devices of the mobile users can access the public network through access points, while Ad-hoc mode is used for a plurality of neighboring mobile nodes to communicate with each other directly.

Referring to FIG. 1, it shows a wireless local network communicating in an infrastructure mode. In this infrastructure mode, each mobile node (or called as wireless node) communicates with other mobile nodes or fixed nodes of the network through the access point (AP). The access point is used as a bridge, transponder, gateway or firewall between the mobile nodes and the wired network. That is to say, in this infrastructure mode, the AP which is a part of the wired network infrastructure is provided as the bridge between the wireless and the wired LAN and through which the mobile nodes can communicate with Internet. FIG. 1 schematically describes an example of the mobile node, i.e. a laptop computer communicates in the infrastructure mode. Though there only shows one mobile node in FIG. 1, it should be understood that there can be many mobile nodes that communicate simultaneously in the infrastructure mode; in addition, the mobile node in FIG. 1 is a laptop computer, however, it should be understood that the mobile nodes can be other wireless devices, including and not limited to, mobile phones, Personal Digital Assistant (PDA), Palm computer, etc. The mobile node, such as the laptop in FIG. 1, normally has a wireless card with which the mobile node can exchange information with other wireless devices through AP, thus the wireless communication among mobile nodes can be realized. AP itself needs a static IP address, and it can support the access of limited number of mobile nodes within its working range (different AP has different working range, the relevant user manual may provide such data, i.e. 30 meters). The working range of AP is called Basic Service Set (BSS) and all the users of the AP share the same BSS ID.

In most wireless local networks, normally, at least one authentication server is used as shown in FIG. 1. The authentication server is used to authenticate the ID of the user on the mobile node. The authentication server can also obtain a lot of information about the user, such as the IP address of the user, the AP through which the user access the network, the time when the user access the network and the time when the user leaves, etc.

If more wireless devices need to be supported in the infrastructure network mode, the following work pattern can be used. Here, multiple APs connect together and share the same authentication server as shown in FIG. 2. FIG. 2 schematically shows an exemplary of an Extended Service Set (ESS) made up of a plurality of APs in the infrastructure mode. Here, each AP has its relevant BSS and all APs' working ranges compose an Extended Service Set (ESS), and the mobile nodes sharing the same ESS ID can roam freely among these APs without losing network connections.

When the mobile node is set to work in the infrastructure mode, it uses a static or dynamic IP address. The authentication server can locate the mobile node according to its relevant AP and IP address.

In Ad-hoc mode, the mobile nodes can communicate with each other directly. That is to say that the mobile node communicates with other mobile nodes in a peer to peer mode within its RF range instead of communicating through the inter-medium node which is the access point of infrastructure mode. When users are very close to each other, Ad-hoc mode connection is very useful for communication. FIG. 3 is the diagram of the communication in Ad-hoc mode. FIG. 3 schematically shows four neighboring mobile nodes, i.e. four laptop computers communicating in Ad-hoc mode. Here, each mobile node is equipped with a wireless card with which two or more mobile nodes can communicate with each other at the peer to peer level and said mobile nodes share a given cell coverage area. When the mobile nodes are set in Ad-hoc mode, they need to be set with static IP addresses and all the mobile nodes which communicate with each other belong to the same working group. Similarly, they also share the same ESS ID.

In the prior art, infrastructure mode is commonly used in office, hot-spot, while Ad-hoc mode is often used in the places without network infrastructure, smaller areas, or close distance communication, i.e. the communication among the exploration workers during the resource exploration in high mountains; as well as communication among rescue worker in the after earthquake or communication among colleagues at a meeting in a meeting room, etc. More specifically when the network resource is limited, as compared with infrastructure mode, Ad-hoc mode can save a great amount of resources when the communication is limited to certain local area.

In the prior art, i.e. the US patent application US2003/0054818A1 entitled as "SYSTEM AND METHOD FOR CONCURRENT OPERATION OF A WIRELESS DEVICE IN TWO DISJOINT WIRELESS NETWORKS" discloses a dual mode wireless device. It can operate in two wireless network modes, i.e. infrastructure mode and Ad-hoc mode. The dual mode device has a wireless controller inserted in the wireless card which has two virtual wireless network adaptors thereon. One is for infrastructure mode and the other for Ad-hoc mode. The wireless control driver controls the switching between the two network modes. This patent application is also related to the switching between infrastructure mode and Ad-hoc mode. It is the switching performed on the network facilities in which the controller controls the two network modes within said one device while the two modes are independent to each other. Each mode accesses its own application program and does not know other's sessions of accessing applications and communicates separately. It can be seen from this application that the technology disclosed by this patent application can not realize accessing the same application and sharing the session for accessing the application when the two communication modes are automatically switched. Therefore, a method and device are needed through which users can access the application with the same session when the two communication modes are switched automatically. This will save the users' network resources and cost when accessing the network applications.

In addition, the US patent application US2004/0063458A1 entitled "WIRELESS LAN COMMUNICATION SYSTEM" discloses a wireless communication system that supports a dual-mode switching and also realizes the automatic switching between infrastructure mode and Ad-hoc mode. The wireless communication system of that patent application judges whether it is necessary to switch from infrastructure to Ad-hoc modes by monitoring data pack. If data pack marked with target address is detected, the channel search will be conducted. When suitable channel is found, the communication mode will be switched to Ad-hoc mode and establish connection between the source and the target. In this system, the source or target workstation is made up of date transfer receiver, wireless interface, data pack header analyzer, channel search engine, switch controller and data cache. When it is necessary to switch from Ad-hoc mode back to infrastructure mode, one party of the source and target workstation of the connection which is already established will send a data pack requesting to switch back to infrastructure mode. Then the two parties will switch back to infrastructure mode. From the above mentioned description of the patent application, the patent application mainly focus on that the network layer parses the data pack and judges whether the target can use Ad-hoc mode or not to switch communication channels. It judges whether to switch or not by adding the header of data pack as identity and it is mainly used for data transfer between two points. Meanwhile, it requires that the two sides of the communication should have the capacity of workstations. Comparatively speaking, this will make the switching between the two modes more complicated. Therefore, a more flexible technical solution is needed to automatically switch between the two modes.

In addition, according to the usage of the wireless local network nowadays, some popular network applications such as network gaming, network chatting, e-meeting, etc., usually operate in infrastructure mode. In certain cases, as a result of the access by too many mobile nodes in infrastructure mode, the network resources get scarce and the operation efficiency is very poor; under that circumstance, if part of the users can be switched to Ad-hoc mode, the resources of the whole network will be balanced. As a matter of fact, in the application of the wireless local network nowadays, when the resources in infrastructure mode are restricted, it is seldom considered to balance the network resource by switching the network applications from infrastructure mode to Ad-hoc mode.

Consider the following scenario, the airport ABC provides network gaming and chatting platform only based on infrastructure mode for the passengers waiting for their airplanes. The Airport ABC charges the passengers' fee according to their network usage or connection time. Most of passengers would like to play network games using a mobile node, such as laptop, PDA, which can access WLAN. But there comes the issue of resource restriction. For example, all the APs in the airport can only support about 200 concurrent users, but there may be more than 400 users wanting to play the network game at the same time. With the current WLAN infrastructure, the principle of "First come, first serve" has to be applied. Consequently, half of the users fail to connect to the network. This causes the low quality of service (QoS) and depresses customer satisfaction. To solve this issue, one way is to add more APs to enlarge the capacity but it will raise the investment (meanwhile per unit cost of connection is increased and potential users may be lost). Also it's not a long-term solution since the number of users/connections is changing. In infrastructure mode, resource allocation can't be dynamically changed according to variation of connections.

SUMMARY OF THE INVENTION

To solve the above mentioned problems, an aspect of the present invention is to provide methods, apparatus and systems which can dynamically switch between two communication modes of the wireless local network, i.e. infrastructure mode and Ad-hoc mode to optimize and balance network resources.

Another aspect of the present invention is according to the variation of connection of the mobile nodes, to dynamically and real-time change the communication mode of the mobile nodes in the WLAN, switching real-time from infrastructure mode to Ad-hoc mode or dynamically switching from Ad-hoc mode back to infrastructure mode.

Another aspect of the present invention is in that when the mobile nodes switch from infrastructure to Ad-hoc mode to optimize network resources, the application the mobile node is accessing will not be affected; when the application can not be accessed by the mobile nodes in Ad-hoc mode, the mobile nodes can switch back to infrastructure mode and return to the previous application interface.

Another aspect of the present invention is in that, at the application level, while the communication channel is switched the application program can be maintained to continue to operate and at the same time communication among many points can be achieved.

Still another aspect of the present invention is to put forward a method and system that can switch between two communication modes based on the judgment of the application in operation, location of users and the status of the network resources.

Still another aspect of the present invention is to provide the mobile nodes with software that can be downloaded from the application server. Through running the software on the wireless devices of the mobile users, the wireless devices of the mobile users can be switched between the two communication modes conveniently and flexibly.

BRIEF DESCRIPTION OF THE DRAWINGS

The features, advantages as well as benefits of the present invention will be more evident and striking through the detailed description of the preferable embodiments with reference to the drawings forming a part of the disclosure herein. The description of the embodiments with reference to the drawings makes it easy to have a better understanding of the present invention, in which.

DETAILED DESCRIPTION OF THE INVENTION

Figure 1:
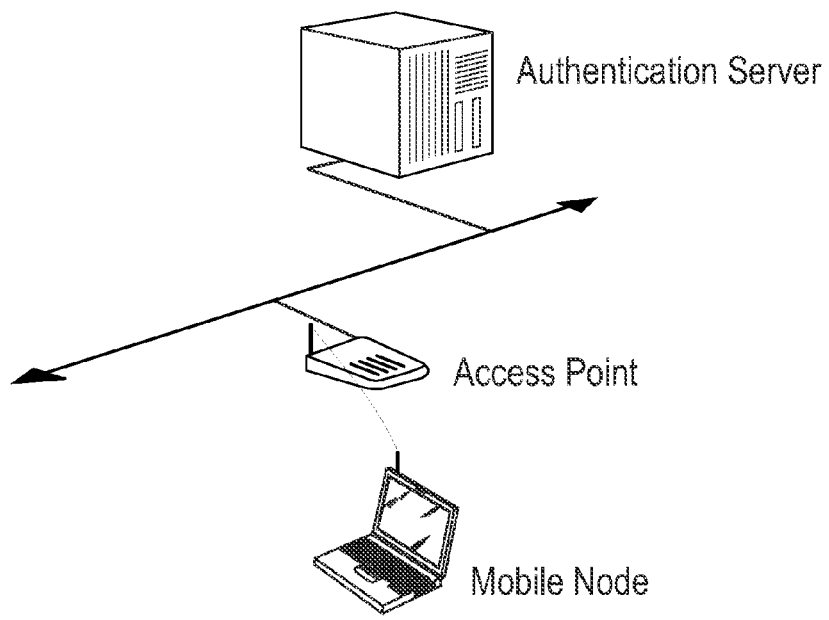
FIG. 1 is a diagram schematically illustrating that the wireless local network communicates in an infrastructure mode.
Figure 2:
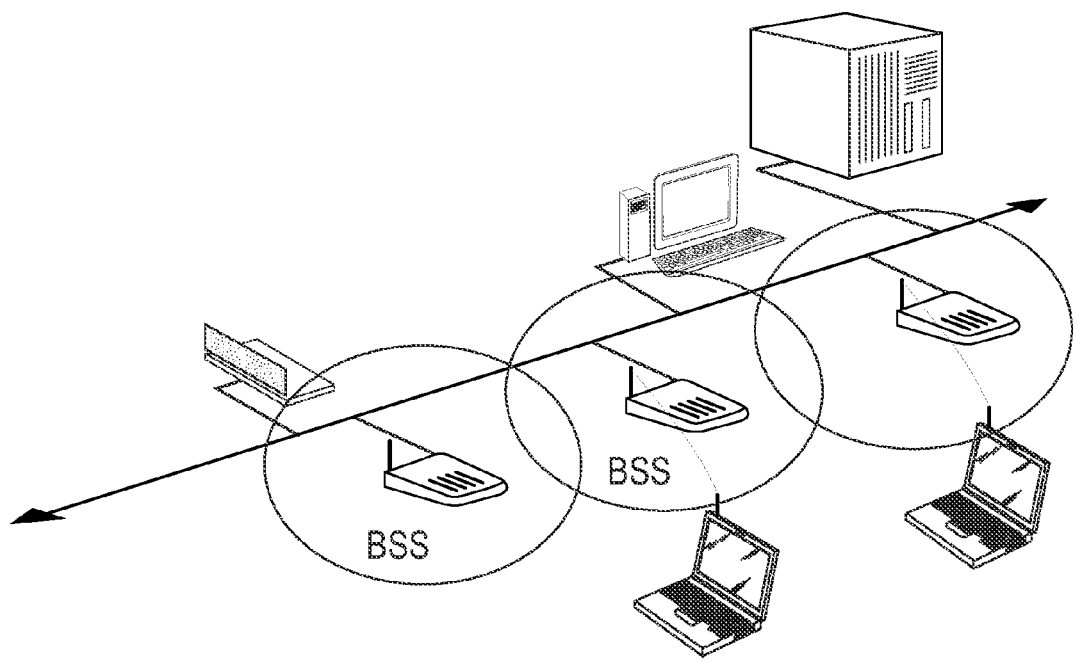
FIG. 2 is a diagram illustrating that multiple APs make up an extended service set in an infrastructure mode.
Figure 3:
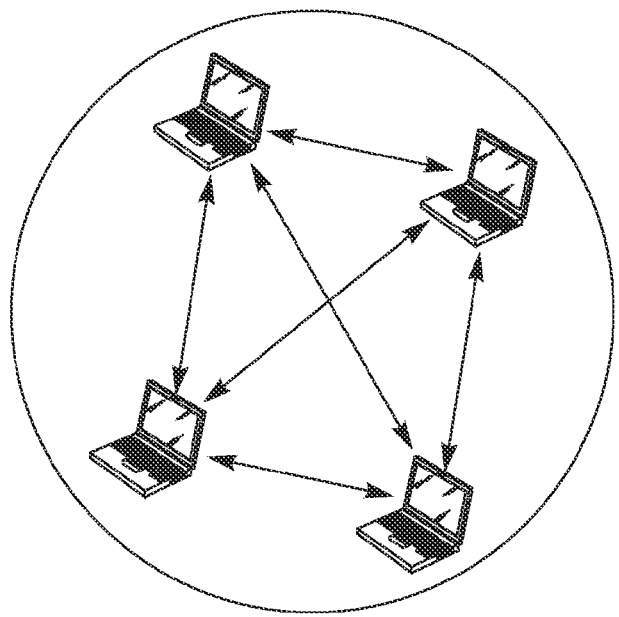
FIG. 3 is a diagram illustrating the communication in Ad-hoc mode.

The present invention provides apparatus, methods and systems to dynamically switch between two communication modes of a wireless local network, i.e. infrastructure mode and Ad-hoc mode to optimize and balance network resources.

The present invention also provides according to the variation of connection of the mobile nodes, to dynamically and real-time change the communication mode of the mobile nodes in the WLAN, switching real-time from infrastructure mode to Ad-hoc mode or dynamically switching from Ad-hoc mode back to infrastructure mode.

The present invention also provides when the mobile nodes switch from infrastructure to Ad-hoc mode to optimize network resources, the application the mobile node is accessing will not be affected; when the application can not be accessed by the mobile nodes in Ad-hoc mode, the mobile nodes can switch back to infrastructure mode and return to the previous application interface.

The present invention also provides at the application level, while the communication channel is switched the application program can be maintained to continue to operate and at the same time communication among many points can be achieved.

The present invention also provides to put forward a method and system that can switch between two communication modes based on the judgment of the application in operation, location of users and the status of the network resources.

The present invention also provides the mobile nodes with software that can be downloaded from the application server. Through running the software on the wireless devices of the mobile users, the wireless devices of the mobile users can be switched between the two communication modes conveniently and flexibly.

For this end, the present invention provides a method for switching a network application operating in a first communication mode to a second communication mode within a wireless local area network, wherein a plurality of mobile nodes access the network through at least one access point and communicate with at least one application server to obtain various network applications provided by said application server in the first communication mode; and a plurality of neighboring mobile nodes can communicate with each other directly in the second communication mode; the method comprising the steps of: when the plurality of mobile nodes accessing the application server on the network through the access points and running the same network application provided by said application server in the first communication mode, judging whether the plurality of mobile nodes are neighboring according to the location information of said mobile nodes; sending an inquiry to the plurality of mobile nodes by said application server inquiring whether they want to switch to the second communication mode to run said network application when said plurality of mobile nodes are neighboring; downloading and installing the network application from said application server to one of the mobile nodes when all said plurality of mobile nodes agree to switch to the second communication mode; configuring each mobile node with the communication parameters under the second communication mode and switching all said mobile nodes to the second communication mode and continuing to run the downloaded and installed network application.

Thus, the present invention provides a system for switching a network application operating in a first communication mode to a second communication mode within a wireless local area network, wherein a plurality of mobile nodes access the network through at least one access point and communicate with at least one application server to obtain various network applications provided by said application server in the first communication mode; and a plurality of neighboring mobile nodes can communicate with each other directly in the second communication mode; the system comprising: an application server for providing a plurality of network applications, wherein the application server includes an application module and an application agent module; a plurality of access points; a plurality of mobile nodes for communicating with the application server through the plurality of access points; each of said plurality of mobile nodes including a client module and a client agent; and a location acquiring apparatus; wherein, in the first communication mode, when the plurality of mobile nodes are accessing the application server on the network through the access points and running the same network application provided by said application server, said application agent module starting said location acquiring apparatus to obtain the location information of said plurality of mobile nodes and judging whether the plurality of mobile nodes are neighboring according to the location information of the mobile nodes sent back by the location acquiring apparatus; the application agent module sending an inquiry to the plurality of mobile nodes inquiring whether they want to switch to the second communication mode to run said network application when the plurality of mobile nodes are neighboring; the application agent module downloading and installing the network application provided by the application server to one of the mobile nodes when all said plurality of mobile nodes agree to switch to the second communication mode; the client agent module on each of the plurality of mobile nodes obtaining from the application agent module the corresponding parameters of each mobile node in the second communication mode; and the mobile nodes switching to the second communication mode and continuing to run the downloaded and installed network application.

Particular embodiments will now be described in connection with the figures. It should be recognized that embodiments disclosed herein are merely illustrative. Within the scope of the invention, a person skilled in the field can amend and modify the invention embodiments, and all variations and equivalents which fall within the range of the concepts embraced therein.

First of the all, an example of a principle of the present invention would be explained. Without loss of generality, the location of all users can be obtained in infrastructure mode. Then, according to the location of the users, some neighboring users who are in the same network application can be switched to Ad-hoc mode together. Through this method, WLAN can support more users and reduce the network traffic at the same time. When one of the users in Ad-hoc mode wishes to leave the network application, the other users will automatically switch their mobile nodes from Ad-hoc mode to infrastructure mode, recover their original network configuration, return to the previous network application and wait for new corners to join the network application.

The disclosed method provides the above mentioned functions: when running certain network applications, such as online gaming or internet chatting or other similar network applications using WLAN, the mobile nodes dynamically switch between Ad-hoc mode and infrastructure mode on-demand.

According to one embodiment of the present invention, in infrastructure mode of WLAN, the application server (a server providing online gaming, online chatting, net meetings, etc) accessed by mobile nodes simultaneously runs a network application of an application agent which is designed according to the present invention. For example, in the network applications such as gaming, chatting or net meeting etc are embedded with an application agent in the manner of software, hardware or combination of software and hardware. When the application agent finds that the connections to any AP approach to the maximum capacity and there are still more users trying to access said application server, the application agent then asks a location apparatus to obtain the locations of the mobile nodes and decides whether these mobile nodes can be switched to Ad-hoc mode. If yes, the application agent negotiates with all the mobile nodes which are in the same session. If all the mobile nodes agree to switch to Ad-hoc mode, the application agent switches all the mobile nodes on demand into Ad-hoc mode so that the network workload is reduced and more users are allowed to obtain the service. Meanwhile, the mobile nodes switching to Ad-hoc mode can continue to access the same service in Ad-hoc mode. That is to say, after being switched to Ad-hoc mode, the users continue to use the network applications such as gaming, chatting and net meetings previously running in infrastructure mode. When one or more mobile users in Ad-hoc leave the network application, other users can be switched on demand back to infrastructure mode and continue to access the same application and wait for new corners to join.

With the popularization of WLAN, the scenario of employing the technical solution of the present invention in which mobile nodes automatically switch from infrastructure mode to Ad-hoc mode and continue the previous network application grows quickly. For example, when passengers are waiting for or in a train, a subway, a bus, or an airplane, they would like to play the network game or chat through the network by the mobile devices. And some of them can be switched automatically to Ad-hoc mode to decrease others' waiting time when the services approach to the maximum load. Furthermore, when colleagues want to hold a local net meeting through WLAN, they can be switched automatically from infrastructure mode to Ad-hoc mode to reduce the network traffic. Since all the applications supporting both infrastructure and Ad-hoc modes can use this method, the potential business value of this method is great.

Obviously, as compared with the common methods using infrastructure mode, the advantages of the method disclosed by the present invention include:

(1) with the same resource, the present invention can support more users, and improve QoS;

(2) dynamically switch between infrastructure mode and Ad-hoc mode to reduce the communication traffic;

(3) reduce the waiting time and cost of user; and (4) increase the income of the providers of network services.

Detailed description to the process of dynamically and automatically switching between infrastructure mode and Ad-hoc mode would be explained with reference to the figures. It should be understood that the illustrative embodiments are for the sake of explanation only but not limitation to the present invention.

Figure 4:
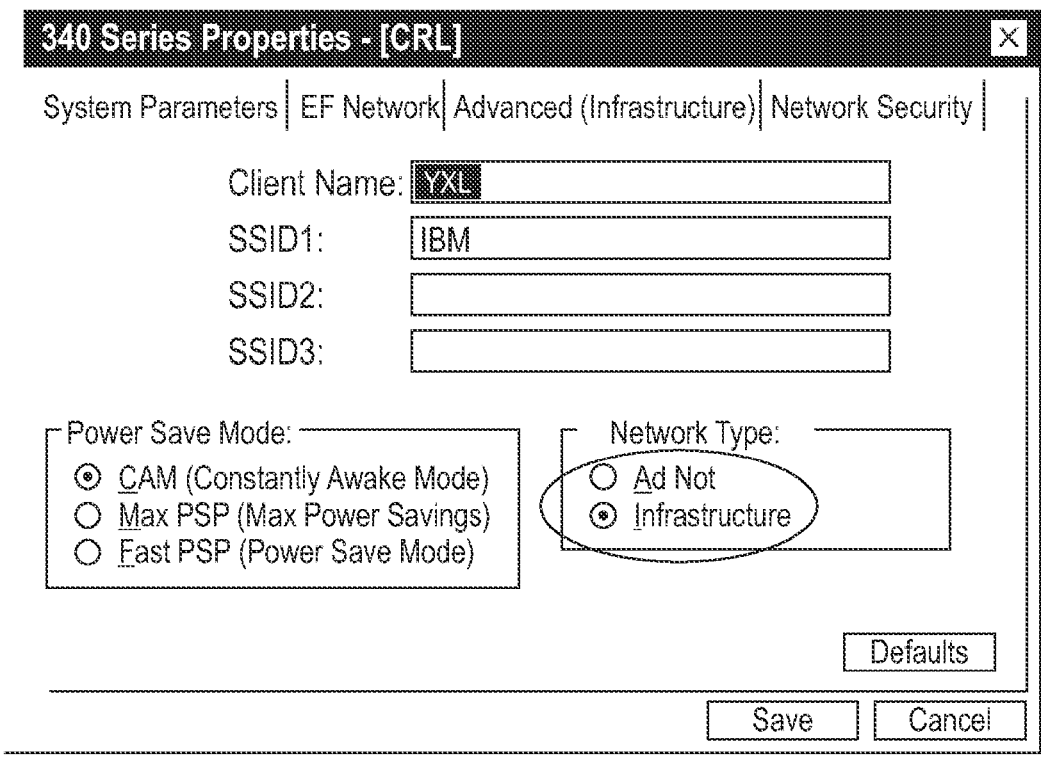
FIG. 4 illustrates an example of the system parameters sub-page of Cisco 340 series wireless card property.
Figure 6:
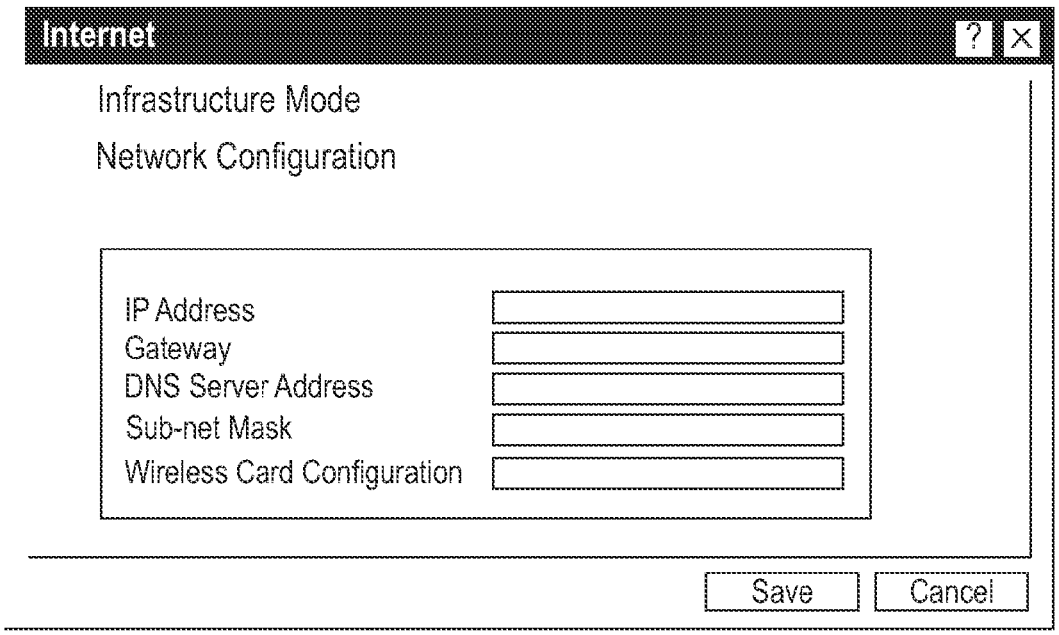
FIG. 6 illustrates a configuration page of a network parameter "Internet Protocol (TCP/IP) Property"

Take the Cisco 340 wireless card for example. According to the present invention, in order to switch from infrastructure mode to Ad-hoc mode without loss of connection to the network application, the mobile nodes should first perform the following operations:

(1) When the mobile node is configured as infrastructure mode, the network configuration thereof would be set up at first. Referring to FIG. 6, it includes some relevant parameters. Parameters such as IP address, gateway, DNS server address, and sub net mask, etc., and wireless card configuration would be set up in the Property page according to the present invention. Referring to the sub-pages of "System Parameters" in FIG. 4, it includes four sub-pages of: system parameters, RF network, Advanced (Infrastructure) as well as Network Security. In said system parameters sub-page, set up the relevant information of the mobile node (that is the client in this illustrative embodiment), such as client name (in FIG. 4, the client name is YXL), SSID (in FIG. 4, the SSID1 is IBM), network type (in FIG. 4, the network type is infrastructure type), Power Save Mode (in FIG. 4, the power save mode is configured as CAM, constantly awake mode), and security level, etc. According to the present invention, all information would be stored into a client agent.

(2) Application agent judges whether the group of mobile nodes which access the same network application in infrastructure mode can switch to Ad-hoc mode. If yes, continue with the next step (3); if no, continue with the judgment of step (2).

(3) Application agent selects a node as the host node for the network application in Ad-hoc mode.

(4) When application agent notifies the mobile nodes to switch from infrastructure mode to Ad-hoc mode, application agent will upload relevant information of client agent and software, including: client agent module, network parameters configuration of mobile nodes switching into Ad-hoc mode and wireless card configuration as well as the network application software and the corresponding sessions that the users run the application software. The mobile nodes may use static IP address, IPv6 address, or dynamic IP address assigned from DHCP server in infrastructure mode. According to the present invention, when switching to Ad-hoc mode, preferably, all addresses should be in a same group, that is to say, their IP addresses should be in one group, i.e. 10.1.2.1, 10.1.2.2, 10.1.2.3, 10.1.2.4, etc. in which only the last digit of the IP addresses are different, meaning that all these IP addresses belong to one group. Application agent transfers suitable IP address and relevant network parameters, wireless card parameters, application software, to client agent of each mobile node and sends the session only to the host node.

(5) Application agents on the mobile nodes configure the network and WLAN wireless card according to the parameter obtained and install relevant software and sessions.

When the client agent set up network parameters, the parameters sent by the application agent would be used to ensure that the nodes to be switched are in the same sub net.

The set up of wireless card by client agent includes: set up two parameters of the system parameters, "network type" and "network security". Since all the mobile nodes switching to Ad-hoc mode share the same SSID, it is only needed to set the network type of the wireless card as Ad-hoc mode and cancel all security setup.

Figure 5:
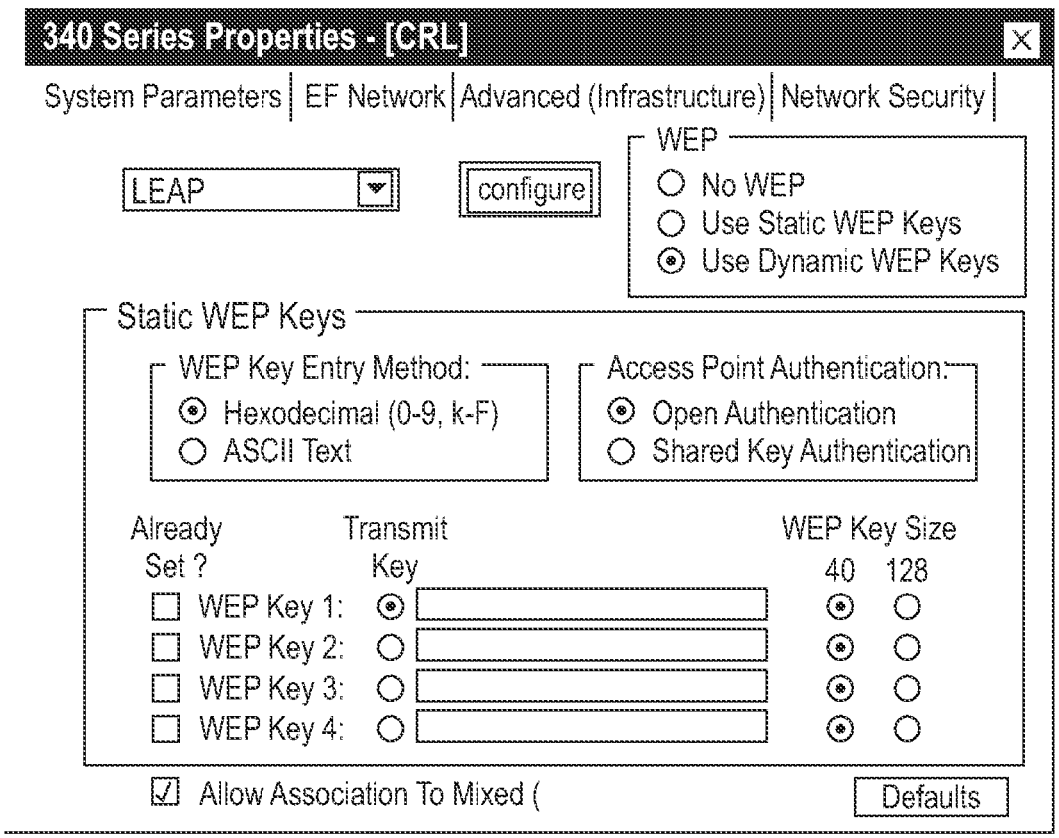
FIG. 5 illustrates network a security page of a Cisco 340 wireless card property.

In FIG. 5, it schematically illustrates the network security sub-page of the property of a Cisco 340 wireless card. In this sub-page, according to the present invention, the Network Security Type originally set as "LEAP" (Light Extensible Authentication Protocol) will be cancelled.

Then the client agent installs network application when the group of said nodes is transferred to Ad-hoc mode. At this time, except for the host, the client agents of all other mobile nodes register with the client agent of the host node and through this host node, the group of said nodes can continue the previous network application together in Ad-hoc mode.

(6) If one or more members of this group of mobile nodes leave and as a result, the network application can not continue to run, the client agents of the mobile nodes will automatically switch back to infrastructure mode and continue to access the previous network application on the server and wait for new corners to join, and then to perform the switching again to Ad-hoc mode.

Next is description of the structures and components implementing the present invention.

Figure 7:
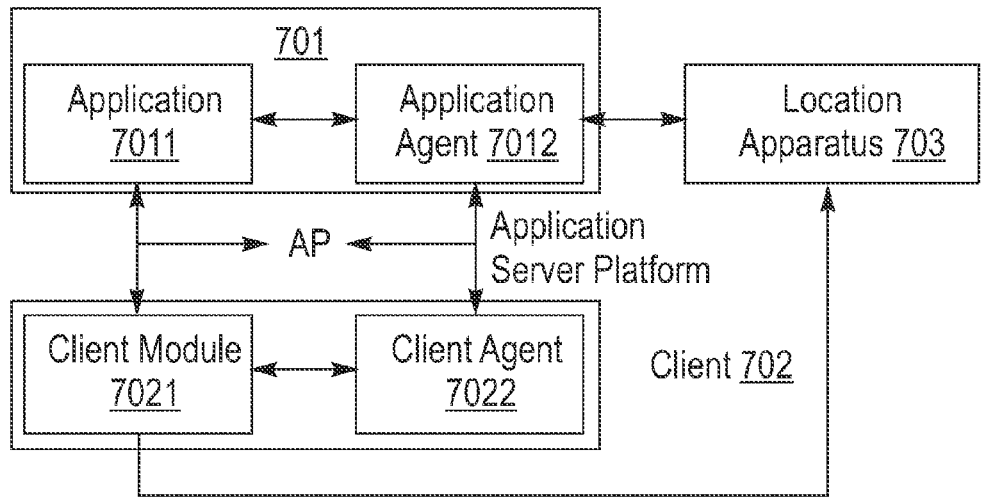
FIG. 7 is a block diagram illustrating the components implementing the method of the present invention.

FIG. 7 schematically illustrates a system that communicates in a WLAN according to the present invention. In this WLAN communication system, only the communication between a mobile user and the application server is shown schematically. However, skilled persons in this field should know it should also include a plurality of application servers and a plurality of mobile users accessing the application server through relevant APs and getting relevant network applications, such as gaming, chatting, net meetings, etc which are executable application software. Referring to FIG. 7, the example it shows includes an application server 701, a client 702 and a location apparatus 703, wherein the application server 701 is the server that provides various network applications to users through WLAN, such as gaming, chatting, and net meetings, etc. Besides, in FIG. 7, there only shows one client, however, it should be known that one application server can communicate with a plurality of clients. In application server 701, there should also include a network application module 7011 which preferably includes various network applications, such as the executable software like gaming, chatting, net meetings, etc. The application server 701 also includes an application agent module 7012 which preferably is executable software, or hardware embedded with software or combination of software and hardware running on the application server. Application agent module 7012 can be associated with application module 7011. It can be standalone or embedded into application software. The functions of the application agent module 7012 will be described in detail later. In client 702, there is a client module 7021 and a client agent module 7022, wherein the client module 7021 and client agent module 7022 are also associated. The local apparatus 703 in FIG. 7 is standalone but it can also be embedded into the module on the application server. In FIG. 7, client 702 accesses application server 701 through APs and accesses the various network applications provided by the server, i.e. executable software like gaming, chatting, net meetings, etc. According to the present invention, location apparatus 703 gets the location information of client 702 and informs the application agent module 7012 of the location information. Meanwhile, if application agent module 7012 finds there is no client agent installed in client, application agent module 7012 will automatically upload the client agent for client, retrieves information of the other players from application and judges whether these players could be switched to Ad-hoc mode. It can also negotiate with client agent module 7022 and manage the auto-switching process for application.

(1) Location Apparatus

The location apparatus 703 can be a standalone or an embedded apparatus. The function of location apparatus 703 is to get the location of the mobile nodes. Several methods or apparatus can be used here. The simplest way is to use the coordination of authentication server and AP to get the location of the mobile nodes. This is the common sense in this field. Authentication server can validate the user's identity, and obtain the user's IP address and associated AP. Because the AP is set on a static location, and the topology of APs is known in prior and the location of each mobile node from different AP varies and the location of APs is different, the signal strength of the mobile nodes obtained by the different APs varies. The location of the mobile nodes can be figured out with the signal strength of three APs (triangularization using signal strength). The location of AP can also be used as the location information of users to judge whether they are neighboring. For those which are neighboring, triangularization of signal strength can be further used. Special location apparatus can also be used, such as GPS, mobile nodes equipped with GPS receiver send location information to apparatus through WLAN.

(2) Application Server

Application server 701 for example can be the software platform for network gaming software or net meeting/chatting software installed on application agent module 7012. According to the present invention, the application server can be divided into two parts. However, skilled person in this field may know, this division is for the sake of explanation only and the present invention is not limited to this situation:

Application module 7011: application module 7011 shares its game session information with the application agent module 7012 and allows the application agent module 7012 to access them, such as deleting the session information of the mobile nodes which have switched to Ad-hoc mode.

Application agent module 7012: according to the present invention, application agent module 7012 can be a standalone component or embedded completely into the application module 7011. Application agent module 7012 for example can also include:

Location listener (not shown in figures): this location listener is used to get location information of mobile nodes from the location apparatus 703;

Application management proxy (not shown in figures): it can get game session information from the application module 7011 and manage them, such as deleting session information of the users who have been changed to Ad-hoc mode, negotiating with client agent module 7022, selecting host from clients, and downloading software, etc;

Decision apparatus (not shown in figures): when the location apparatus 703 is some kind of special location apparatus, it can decide whether some clients can be changed to Ad-hoc mode by computing the distance between them; the decision apparatus used herein can make such decision by employing similar methods as the location apparatus would use; therefore detailed explanations would be omitted.

(3) Client

Client 702, namely a mobile node is equipped with wireless card and can access network through wireless location area network. It can also access the services provided by the application server, download software from the application server, etc. Mobile node can be a laptop, a PDA, etc. A client agent module 7022 is installed on it. The client can also be divided into two parts as explained below: pure client module and client agent module. However, skilled person in this field may know that this division is for the sake of explanation only and the present invention is not limited to the situation:

Client module 7021: it includes the module for host client and the module for other common clients. The host client module represents the most powerful mobile node among all nodes switching to Ad-hoc mode. Except for the functions that common client could perform, the host client module can still download, run or upload game host software and manage the game in Ad-hoc mode.

Client agent module 7022: it stores the hardware and software configuration, such as CPU, HD, memory etc, negotiates with the application agent module 7022, saves old network configuration, and reconfigures the client network configuration. The client agent module 7022 can communicate with other agents in Ad-hoc mode, and can communicate with the application agent in Infrastructure mode.

(4) Access Point: through it, the mobile node (namely the client) can connect to the application server and get the services from the application server.

Next is the workflow description taking network game as an example. It should be understood that, for the sake of description, this illustrative embodiment selects network gaming scenario for description but other scenarios can also be considered, such as chatting, net meetings, etc. for the description of the workflow chart of the present invention.

(1) According to the present invention, at first, an application agent is installed in the application server, and the application is running in the server side to provide application programs such as networking gaming, chatting, or e-meeting etc., and the application agent gets host software and hardware configuration requirements from the application;

(2) For example, Clients C1-C4 enter the hot spot, associate the AP and begin to launch the network game. Before he/she plays the network game, the server checks whether the clients has installed client agent. If not, automatically upload and install it on the client; if yes, the application agent gets user preference and the information of past partners, initiates the game for these users.

(3) Suppose that Client 1 is the host in the game. Clients 1-4 can use mobile IP, IPv6 or get dynamic IP address through DHCP server. Client 1-4 agents store their network configuration in infrastructure mode.

(4) The application agent gets access information from the authentication server and find that some AP's work load is too heavy, for example, AP1 can only support 30 users and now 28 users have associated it, the threshold of workload can be set up by the server administrator;

(5) The application agent starts the location apparatus to get the locations of the mobile nodes and the location apparatus sends the location information of the mobile nodes to the application agent.

(6) The application agent gets to know that some users are playing the game from the application server, for example, C1-C4 are playing in a game. It can further judge whether C1-C4 can change to Ad-hoc mode according to their locations. If not, let them continue to work at infrastructure mode or if location information indicates that users can not switch to Ad-hoc mode, application agent can firstly send a message to client agent informing users of changing locations to other places so that they can switch to Ad-hoc mode to lower costs. Otherwise, go to next step;

(7) The application agent gets the software and hardware configuration of the clients who can be switched to Ad-hoc, decides whether some of them can be the host; if not, let them continue to work at infrastructure mode. The decision principles for the host include:

Check the software and hardware configuration of each client, such as CPU, hard disk, memory, software platform, judge whether it can be the host;

If more than one client can be the host, select the one with the best configuration as the host; here best means faster CPU, bigger memory, bigger hard disk and higher version software platform;

If one client has installed host software, it should be the host.

(8) If the host has been selected, the application agent negotiates with all client agents: ask them whether they would like to work in Ad-hoc mode to reduce the cost; if C1-C4 all agree to switch to Ad-hoc mode, C1-C4 agents begin to work according to process (9) below; otherwise, let them continue to work at infrastructure mode.

(9) The application agent uploads suitable game software to C1-C4, if C4 is selected as the host, it also needs to be uploaded the session and install it.

(10) The application agent assigns the C1-C4 with static IP addresses, subnet mask and SSID and deletes their session information from application;

(11) Each client agent stores its user's preference, that is, the game he/she is playing and its IP address, AP, the IP address of the partners.

(12) The Client agent receives the client configuration from the application agent, stores its old network configuration, releases the old IP address, and reconfigures the client with the new parameter;

(13) C4 invites C1-C3 and they continue the session;

(14) When the client agent detects that one of C1-C4 leaves the game, the client agent releases Ad-hoc mode, that is, it reconfigures the network parameters and wireless card parameters and reconnects to application;

(15) If the application checks that the client has installed client agent, then it checks the client preference to ensure it is set on today. After that, it selects the suitable software for the client, and finds the other partners. And finally, it helps them to re-compose the game. The re-composed clients will wait for the new corner to join their game.

(16) The client agent provides tools to remove the uploaded software.

Figure 8:
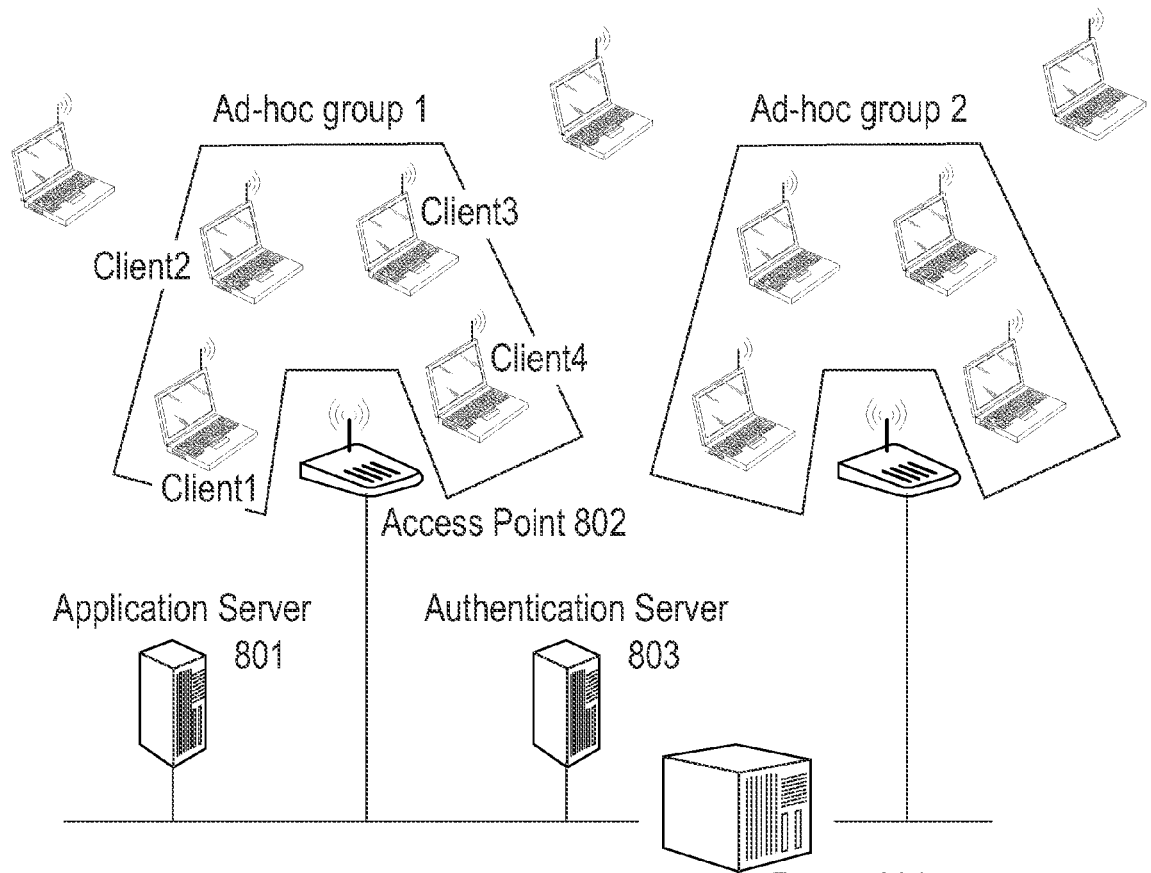
FIG. 8 is a flow diagram illustrating the switching from infrastructure mode to Ad-hoc mode and continuing previous application according to the present invention.

Referring to FIG. 8, it schematically shows the switching from infrastructure mode to Ad-hoc mode according to the present invention for communication. As illustrated in FIG. 8, a first Ad-hoc network group 1 includes four clients, C1, C2, C3, and C4. These four clients communicate with an application server (same as the server in FIG. 7) through an access point 802. Similarly, it also illustrates a second Ad-hoc network group 2 with four clients communicating with application server 801 through a second access point. It can also include other Ad-hoc network groups which communicate with application server 801. For the sake of clarity, they are not described here in details. The communication system in FIG. 8 also includes an authentication server 803. It is used to get IDs of authenticated users and IP addresses of users and associated APs (may also participate in obtaining the locations of mobile nodes) in the process of switching between infrastructure mode and Ad-hoc mode. This is the common sense of this field. In addition, in the communication system in FIG. 8, a router 804 is also provided which is well known in this field.

Figure 9:
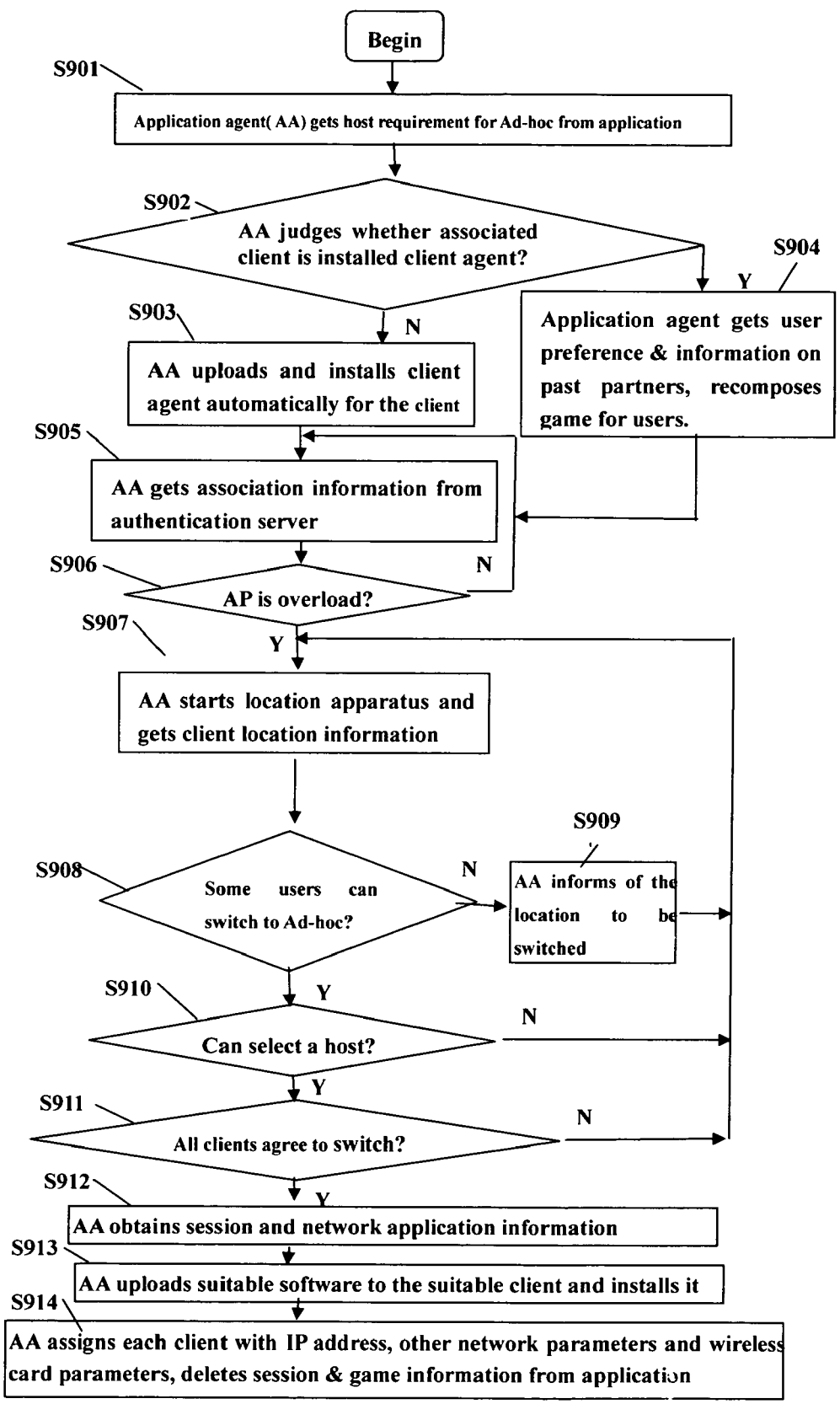
FIG. 9 is a flow diagram illustrating operations carried out by the application agent in the application server.
Figure 10:
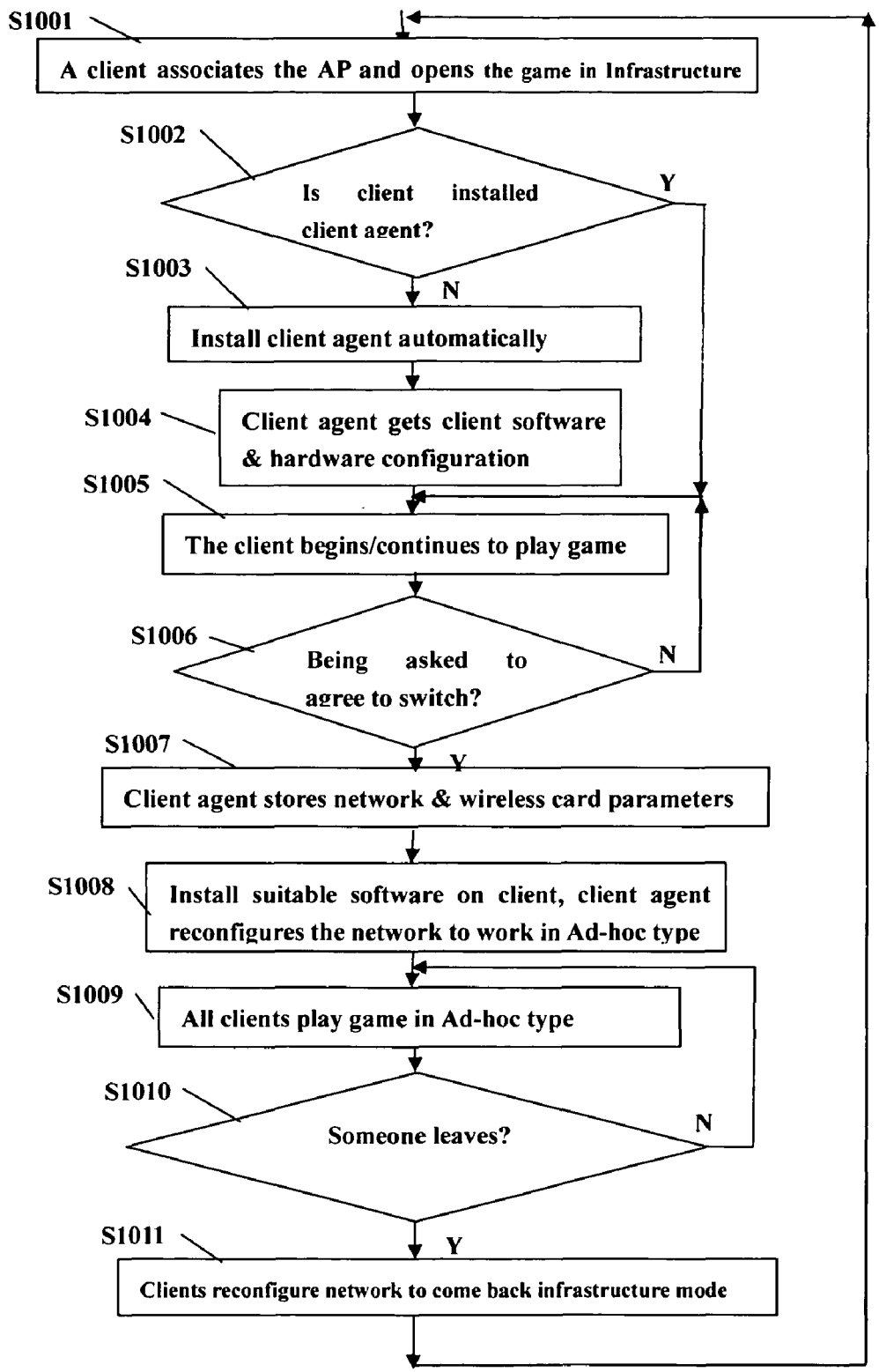
FIG. 10 is a flow diagram illustrating the operations carried out by the client agent in the client terminal of the mobile nodes.

FIG. 9 and FIG. 10 show the steps of executing the application agent process on the application server and of executing client agent process on the client respectively.

Referring to FIG. 9, it shows the work flow of the operation executed by application agent on the application server.

When application server runs an application providing such as network gaming, net-chatting or net meetings, etc, firstly, in step S901, an application agent AA installed on the said application server gets the host software and hardware configuration requirements in Ad-hoc mode from the running application.

When users access to network and join the network application provided by the application server, for example when Client C1-C4 launch a network game through the same access point in infrastructure mode, before the users start playing games, at step S902, application agent will judge whether associated clients, namely clients C1-C4, have been installed client agent. If no, the result of judgment at step S902 is NO and the process moves to step S903, application agent uploads and installs client agent on the clients automatically. Otherwise, if the result of step S902 is YES, that is, the client agent is installed on clients. The process moves to S904. The application agent gets the information of the users' preference and the information on past partners and starts the users' games.

Next, when the client agent is installed at step S903, or the user prepares to start the network game at step S904, the application agent gets relevant information from the authentication server at step 905. For example, verifying the user' ID from the authentication server and getting the IP addresses of the user' and associated AP.

At step S906, judge whether the access point is overload, that is, judge whether the number of users supported by current access point has exceeded the maximum it can support. If the result of step S906 is NO, the process will return to step S905 and continue to get relevant information from the authentication server. If the result of judgment of step S906 is YES, the current access point should be regarded as overloaded. Then the process will go to step S907.

At step S907, the application agent starts a location apparatus and obtains the location information of the clients. For example, Clients C1-C4 can use mobile IP, IPv6 or get dynamic IP addresses from DHCP server. Here, the location of the mobile nodes can be obtained in several ways or with several apparatus. The simplest way is to get the location of the mobile nodes through authentication server and the triangularization of the signal strength, which is the common sense in this field. The users' location can also be obtained in other ways, such as GPS technology.

Next, at step 908, the process judges whether some users can switch to Ad-hoc mode. If YES, the process moves to step S910. Otherwise, if the result is NO, the process then moves to step S909. Application agent can prompt client agent of the location where the mobile nodes can move to and in which location the mobile nodes can switch to Ad-hoc mode to lower costs. Then the application agent returns to step S907 to continue to launch location apparatus to obtain the location information of the mobile nodes.

In step S910, further judgment is made on whether it is possible to select one from the said users as the host in Ad-hoc mode. If there is no such a client, let them continue to work in infrastructure mode. The principle for judging the host in Ad-hoc mode includes:

checking the software and hardware configuration of each client, such as, CPU, Hard Disk, memory, software platform and judge whether they can be the host in Ad-hoc mode;

If more than one client can be the host in Ad-hoc mode, select the one with the best configuration as the host in Ad-hoc mode; wherein the best configuration means: faster CPU, bigger memory, bigger hard disk and higher version software platform;

If one client has been installed host software, it should be selected as the host in Ad-hoc mode.

If the result of step S910 shows that at least one from the current clients can be selected as the host, the process then goes to step S911. Otherwise, the application agent returns to step S907 and continues to launch location apparatus to get the location information of the mobile nodes.

In step S911, application agent negotiates with all of the current clients, such as client C1-C4, asking them whether they wish to work in Ad-hoc type network; if Client C1-C4 all agree to switch to Ad-hoc mode, then the process goes to step S912. Otherwise, application agent returns to step S907 and continues to launch location apparatus to obtain location information of the mobile nodes.

In step S912, application agent further obtains information of sessions between the application server and the clients and information about games from the application server.

Then the process moves to step S913. The application agent uploads suitable game software to client C1-C4. If client C4 is selected as a host, the application agent further uploads the session between the clients and application server and installs the session in client 4. If Clients C1-C4 don't agree to switch to Ad-hoc mode, let C1-C4 continue to work in infrastructure mode.

After clients C1-C4 choose to switch to Ad-hoc mode, in step S914, application agent assigns C1-C4 with static IP addresses and network parameters such as subnet mask and SSID whilst deletes session information and network application program information from the application.

Through the above mentioned operation, the dynamic switching from infrastructure mode to Ad-hoc mode is fulfilled, whereby the benefits are achieved as follows: (1) with the same resource, the present method can support more users, and improve QoS; (2) dynamically switch between infrastructure mode and Ad-hoc mode to reduce the communication traffic; (3) reduce the waiting time and cost of user; and (4) increase the income of the provider of network services.

Referring to FIG. 10, it illustrates the flow chart of the operation performed by client agent on the clients.

When a user wishes to join, for example an application such as network game, firstly in step S1001, this user will connect his/her client with the application server which provides network games through an AP in infrastructure mode and open a network application.

In step S1002, before the user starts the network game, the application server has a check on the client to see if the client is installed with a client agent. If this client has been already installed the client agent, then it is allowed to start a game. Otherwise, the process moves to step S1003 where the application server automatically installs the client agent on the client and said client agent obtains relevant client software and hardware configuration in step S1004.

Next, in step S1005, the client starts to officially access the network application. In the process of client participating in network application, when the application server finds that the number of users supported by the current AP has exceeded the maximum it can support, the application server will prompt users of whether they wish to switch to Ad-hoc mode. That is in step S1006, for example, a window will pop up on the client's screen asking the users whether they agree to switch to Ad-hoc mode. Likewise, other methods can be used to ask whether the users wish to switch i.e. in audio and visual forms or rolling bars. If the users do not agree to switch, let said users be in infrastructure mode and continue their game; however, if the users agree to switch, then the process moves to step S1007. The client agent stores the parameters of network and wireless card and the users' preference, such as the game played and IP addresses, AP and IP addresses of the partners.

Next, in step S1008, suitable software is installed in the clients. Wherein said software is the network application software to be installed on the host in Ad-hoc mode; and the client agent reconfigures the network of the clients to work in Ad-hoc mode.

Thus all clients of one group are configured, such as Client C1-C4. Then, in Ad-hoc mode, continue the games played by client C1-C4 in infrastructure mode, step S1009.

When in step S1010, the host in Ad-hoc mode detects that some users leave, the process moves to step S1011. The host in Ad-hoc mode notifies other client agents to release Ad-hoc mode and reconfigure network parameters and wireless card parameters to recover infrastructure mode and return to the original network application. Preferably, the client agent provides tools to delete the uploaded software.

From the above mentioned description, it can be known that the whole work process is automatic. When switching between infrastructure mode and Ad-hoc mode, the users will feel slightly slow. What the users need to do is to agree to switch to Ad-hoc mode to reduce cost.

Hence, the benefits of the method and system based on the present invention to switch between the different modes of wireless local network are:

(1) For Airport: Airport can charge the users who work in infrastructure mode more money and charge the users who work in Ad-hoc mode less money. It can also add switching principles, for example, unless AP's association to the network arrives at maximum load, the switch function will not start up so that the airport can obtain maximum profit with the same resource. Also, the airport improves the quantity of service and reduces the network traffic.

(2) For users: the proposed method reduces waiting time of the use and thus increases customer satisfaction. A user can freely make his/her choice: switch to Ad-hoc mode and reduce the cost; or continue on infrastructure mode.

Various embodiments for implementing the method and system of switching between two different modes of wireless local area network according to the present invention have been described in detail above in combination with the figures thereof. However the described embodiments are merely for the purpose of exemplary. Various changes or modifications may be made by the skilled persons without departing from the sprit and scope of the invention. Accordingly, the present invention is not limited to the illustrative embodiments except as specified in the attached claims. The description above focuses on these particular disclosed embodiments, however, it should be understood that the present invention is not limited to these.

Thus, the present invention can be realized in hardware, software, or a combination of hardware and software. It may be implemented as a method having steps to implement one or more functions of the invention, and/or it may be implemented as an apparatus having components and/or means to implement one or more steps of a method of the invention described above and/or known to those skilled in the art. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods. Methods of this invention may be implemented by an apparatus which provides the functions carrying out the steps of the methods. Apparatus and/or systems of this invention may be implemented by a method that includes steps to produce the functions of the apparatus and/or systems.

Computer program means or computer program in the present context include any expression, in any language, code or notation, of a set of instructions intended to cause a system having an information processing capability to perform a particular function either directly or after conversion to another language, code or notation, and/or after reproduction in a different material form.

Thus, the invention includes an article of manufacture which comprises a computer usable medium having computer readable program code means embodied therein for causing one or more functions described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for a mobile node to perform dynamically switching between infrastructure and peer to peer communication-modes to optimize and balance network resources, the method comprising steps of:

in a wireless area network wherein a plurality of mobile nodes participate in a session by accessing the wireless area network through an access point to communicate with an application server to access at least one network application;

providing to the plurality of mobile nodes, in the infrastructure communication mode, by the application server, the at least one network application;

determining that the access point is overloaded;

using an application agent module to start a location apparatus determining that the plurality of mobile nodes are running the same network application;

using the application agent module to ask the location apparatus to determine which of the plurality of mobile nodes are neighboring nodes by accessing location information of each of said mobile nodes, wherein the neighboring nodes are mobile nodes that communicate with each other directly in a peer to peer communication mode;

sending an inquiry to the neighboring nodes by said application server inquiring whether the neighboring nodes want to switch to the peer to peer communication mode to run said network application;

selecting one of the neighboring nodes as host node in the peer to peer communication mode by:

obtaining host configuration requirements for the peer to peer communication mode from the network application of the application server;

selecting the host node from the neighboring nodes, wherein the step of selecting comprises using a method selected from a group consisting of: checking a configuration of each neighboring node to judge whether said neighboring node can be used as the host node in the peer to peer communication mode; selecting the neighboring node with a best configuration as the host node of the peer to peer communication mode, wherein the best configuration comprises: a fastest CPU; and selecting the neighboring node as the host node if it has host software installed on it;

downloading and installing the network application from said application server to the host node when all the neighboring nodes agree to switch to the peer to peer communication mode;

downloading the session between the mobile nodes and the application server to the host node;

configuring each neighboring node with communication parameters under the peer to peer communication mode; and switching all the neighboring nodes to the peer to peer communication mode and continuing to run the downloaded and installed network application in said peer to peer communication mode, such that the neighboring nodes can communicate with each other directly peer-to-peer, thereby bypassing the overloaded access point, wherein when the mobile nodes switch from the infrastructure to the peer to peer mode to optimize network resources, the application being accessed by the mobile node remains unaffected.

2. The method of claim 1, further comprising one of said application server and an authentication server, obtaining the location information of the mobile nodes, session information between the mobile nodes and said application server and the associated information about the network application.

3. The method of claim 1, wherein the step of determining whether the plurality of mobile nodes are neighboring nodes according to the location information of the mobile nodes further comprises the steps of, using at least one of the following methods to judge:

a) obtaining the location of the mobile nodes through coordination of an authentication server and the access point;

b) judging whether the plurality of mobile nodes are neighboring by the triangularization of signal strength according to various distances between mobile nodes and different access points;

c) judging whether said mobile nodes are adjacent firstly by using a location of the access point as the user location information; and for the adjacent mobile nodes, further using the triangularization of the signal strength to judge whether they are neighboring; and d) sending the location information through the wireless area network by using special location apparatus thereby to judge whether the mobile nodes are neighboring.

4. The method of claim 1, further comprising causing other mobile nodes to register with said host node when switching to the peer to peer communication mode.

5. The method of claim 1, wherein the step of configuring each neighboring node with communication parameters under the peer to peer communication mode comprises the step of: configuring each neighboring node with IP address, network parameters and wireless card parameters.

6. The method of claim 1, further comprising setting and saving the network configuration for the plurality of mobile nodes when configured to operate in the infrastructure communication mode.

7. The method of claim 1, further comprising said plurality of mobile nodes using static IP address or IPv6 address, or dynamic IP address assigned by the DNS server of the first communication mode; and judging whether addresses of the plurality of mobile nodes are in a same group when prepared to switch to the peer to peer communication mode.

8. The method of claim 1, further comprising:

determining whether said mobile nodes are installed with a client agent;

automatically uploading and installing the client agent for the mobile nodes when the client agent is not installed in the mobile nodes, wherein the installed client agent sets the network and wireless card and installs corresponding software and session information according to obtained parameters; and transmitting suitable IP address, corresponding network parameters, wireless card parameters, application software to the client agent on each of the plurality of mobile nodes.

9. The method of claim 1, further comprising causing said mobile nodes automatically switch back to infrastructure mode to re-access the previous network application on the application server when the network application is running in the peer to peer communication mode, and one or more mobile nodes leave.

10. A system for switching a network application operating in an infrastructure communication mode to a peer to peer communication mode within a wireless local area network, said system comprising:

a wireless area network;

an access point that is overloaded;

at least one application server for providing a plurality of network applications, wherein the application server includes an application module and an application agent module;

a plurality of mobile nodes participating in a session by accessing the wireless area network through the access point and communicating with the at least one application server to obtain various network applications provided by said application server in the infrastructure communication mode; each of said plurality of mobile nodes including a client module and a client agent; and an application server configured for asking a location acquiring apparatus for determining which of the plurality of the mobile nodes are neighboring nodes, wherein the neighboring nodes are mobile nodes that can communicate with each other directly in a peer to peer communication mode;

wherein, in the first communication mode, when the plurality of mobile nodes are accessing the application server on the network through the overloaded access point and running a same network application provided by said application server, the application agent module starts the location acquiring apparatus to obtain location information of each of the plurality of mobile nodes; and the application server:
sends an inquiry to the mobile nodes, inquiring whether the mobile nodes want to switch to the peer to peer communication mode to run said network application as neighboring nodes;
selecting one of the mobile nodes as a host node in the peer to peer communication mode when all the neighboring nodes agree to switch to the peer to peer communication mode, the selecting comprising steps of:
obtaining host configuration requirements for the peer to peer communication mode from the network application of the application server;
selecting the host node, wherein the step of selecting comprises using a method selected from a group consisting of: checking a configuration of each neighboring node to judge whether said neighboring node can be used as the host node in the peer to peer communication mode; and selecting the neighboring node with a best configuration as the host node of the peer to peer communication mode, wherein the best configuration means at least one of: fastest CPU, bigger memory, bigger hard disk and higher version of software platform; and selecting the mobile node as the host node if it has host software installed on it;
downloading and installing the network application provided by the application server on the host node, and
receiving and installing by the host node the session concerning the network application from the application server;
configuring each neighboring node with communication parameters under the peer to peer communication mode; and
switching all the neighboring nodes to the peer to peer communication mode and continuing to run the downloaded and installed network application in said peer to peer communication mode, such that the neighboring nodes can communicate with each other directly peer-to-peer, thereby bypassing the overloaded access point;
wherein when the mobile nodes switch from the first infrastructure mode to the peer to peer mode to optimize network resources, the application accessed by the mobile node remains unaffected.

11. The system of claim 10, wherein the first communication mode is an infrastructure mode and the peer to peer communication mode is a peer to peer ad-hoc communication mode.

12. The system of claim 11, wherein each client agent module is configured to cause said mobile nodes to automatically switch back to infrastructure mode to re-access the previous network application on the application server when the network application is running in the peer to peer communication mode, and one or more mobile nodes leave.

13. The system of claim 10, wherein the location apparatus is further configured to: obtain, by said application server or an authentication server, session information between the mobile nodes and said application server and the associated information about the network application.

14. The system of claim 10, wherein the application agent module further comprising a judging means for judging whether the plurality of mobile nodes are neighboring, using at least one of the following methods:
obtaining the location of the mobile nodes through coordination of the authentication server and the access point;
judging whether the plurality of mobile nodes are neighboring by the triangularization of the signal strength according to various distances between the mobile nodes and different access points;
judging whether the mobile nodes are adjacent firstly by using the location of the access point as user location information; and for the adjacent mobile nodes, further using the triangularization of signal strength to judge whether they are neighboring; and
sending location information through the wireless local area network by using special location apparatus thereby to judge whether the mobile nodes are neighboring.

15. The system of claim 10, wherein the client agent module on the host node is further configured to: cause other mobile nodes to register with said host node when switching to the peer to peer communication mode.

16. The system of claim 10, wherein communication parameters obtained by each client agent module under the peer to peer communication mode comprise: an IP address for each mobile node, network parameters and wireless card parameters.

17. The system of claim 10, wherein each client agent module is further configured to set and save the network configuration for the plurality of mobile nodes when configured to operate in the infrastructure communication mode.

18. The system of claim 10, wherein said plurality of mobile nodes using static IP address or IPv6 address, or dynamic IP address assigned by the DNS server of in the first communication mode; and the application agent module is configured to judge whether the addresses of the plurality of mobile nodes are in a same group when prepared to switch to the peer to peer communication mode.

19. The system of claim 10, wherein the application agent module is further configured to:
judge whether said mobile nodes are installed as a client agent;
automatically upload and install the client agent for the mobile nodes when the client agent is not installed in the mobile nodes;
transmit suitable IP address, corresponding network parameters, wireless card parameters, application software to the client agent on each of the plurality of mobile node; and
the client agent on each of plurality of mobile nodes is configured to set the network and wireless card, and to install corresponding software and sessions according to parameters obtained.

20. A computer readable storage medium having computer readable program code embodied therein for causing switching of a network application, the computer readable program code comprising instructions for causing a computer to effect the steps of:
providing to a plurality of mobile nodes, in a infrastructure communication mode, by an application server at least one network application;
in a wireless area network wherein the a plurality of mobile nodes participate in a session by accessing the wireless area network through an access point to communicate with an application server to obtain at least one network application;

determining that the access point is overloaded;

using an application agent module starting a location apparatus for determining that the plurality of mobile nodes are running a same network application provided by said application server in the first communication mode, using the application agent module to ask the location apparatus to determine which of the plurality of mobile nodes are neighboring nodes by accessing location information of each of said mobile nodes, wherein the neighboring nodes are mobile nodes that can communicate with each other directly in a peer to peer communication mode;

sending an inquiry to the neighboring nodes by said application server inquiring whether the neighboring nodes want to switch to the peer to peer communication mode to run said network application;

selecting one of the neighboring nodes as the host node in the peer to peer communication mode when all the neighboring nodes agree to switch to the peer to peer communication mode; said selecting step comprising steps of:

obtaining host configuration requirements for the peer to peer communication mode from the network application of the application server;

selecting the host node, wherein the step of selecting comprises using a method selected from a group consisting of:

checking a configuration of each neighboring node to judge whether said neighboring node can be used as the host node in the peer to peer communication mode; and selecting the neighboring node with a best configuration as the host node of the peer to peer communication mode, wherein the best configuration means at least one of: fastest CPU, bigger memory, bigger hard disk and higher version of software platform; and selecting the mobile node as the host node if it has host software installed on it;

downloading and installing the network application provided by the application server on said host node, and receiving and installing by said host node the session concerning said network application from said application server;

configuring each neighboring node with communication parameters under the peer to peer communication mode; and switching all the neighboring nodes to the peer to peer communication mode and continuing to run the downloaded and installed network application in said peer to peer communication mode, such that the neighboring nodes can communicate with each other directly peer-to-peer, thereby bypassing the overloaded access point;

wherein when the mobile nodes switch from the infrastructure mode to the peer to peer mode to optimize network resources, the application accessed by the mobile node remains unaffected.

* * * * *